No. 857,329.  
PATENTED JUNE 18, 1907.

W. CAREY.  
COOKING KETTLE.  
APPLICATION FILED JULY 16, 1906.

WITNESSES:

William Carey INVENTOR

By  
ATTORNEYS

THE NORRIS PETERS CO., WASHINGTON, D. C.

UNITED STATES PATENT OFFICE.

WILLIAM CAREY, OF SEATTLE, WASHINGTON, ASSIGNOR, BY MESNE ASSIGNMENTS, TO N. T. JOLLIFFE, OF SEATTLE, WASHINGTON.

COOKING-KETTLE.

No. 857,329.  Specification of Letters Patent.  Patented June 18, 1907.

Application filed July 16, 1906. Serial No. 326,486.

*To all whom it may concern:*

Be it known that I, WILLIAM CAREY, a citizen of the United States, residing at Seattle, in the county of King and State of Washington, have invented a new and useful Cooking-Kettle, of which the following is a specification.

This invention relates to cooking utensils and more particularly to an improved cover or closure for pots, kettles and other domestic boilers.

The object of the invention is to provide a kettle having a perforated cover provided with a vertically disposed guard or shield thereby to prevent the steam from scalding or otherwise burning the hands of the operator when the kettle is tilted to drain off the surplus liquid from the vegetables or other contents of the kettle.

A further object is to provide a lifting lever to assist in supporting the kettle in tilted position, said lever serving to lock the cover in engagement with the kettle thereby to prevent accidental displacement of the same during the pouring or draining operation.

A still further object of the invention is to generally improve this class of devices so as to increase their utility, durability and efficiency as well as to reduce the cost of manufacture.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

Figure 1:
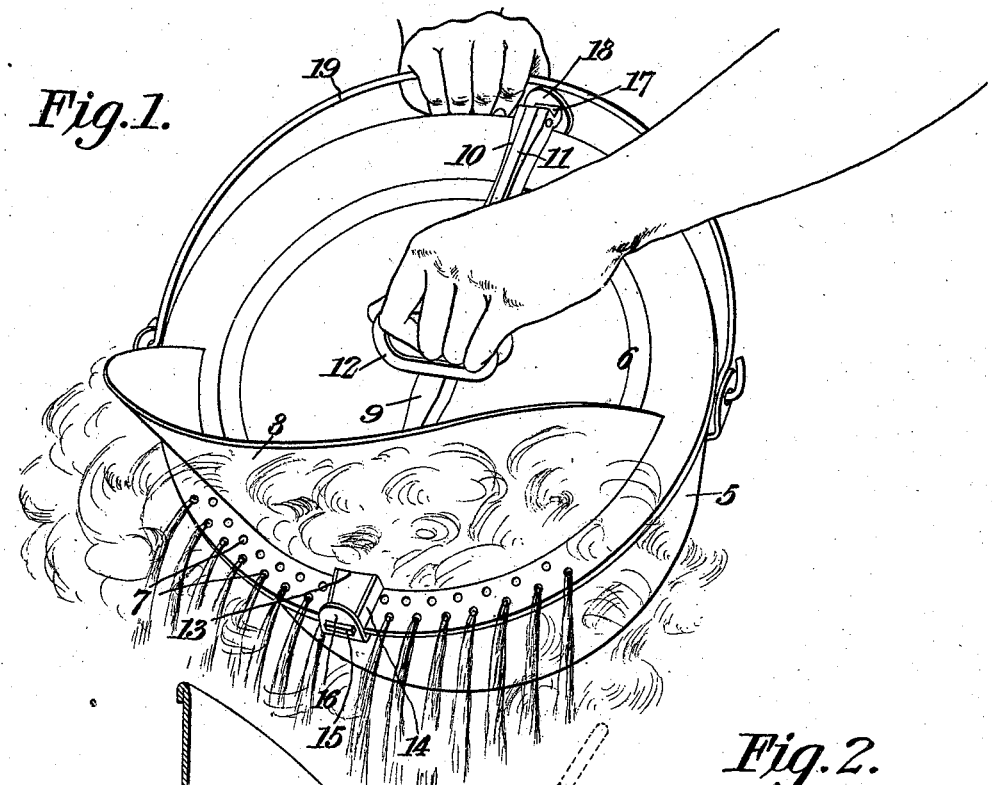
Figure 2:
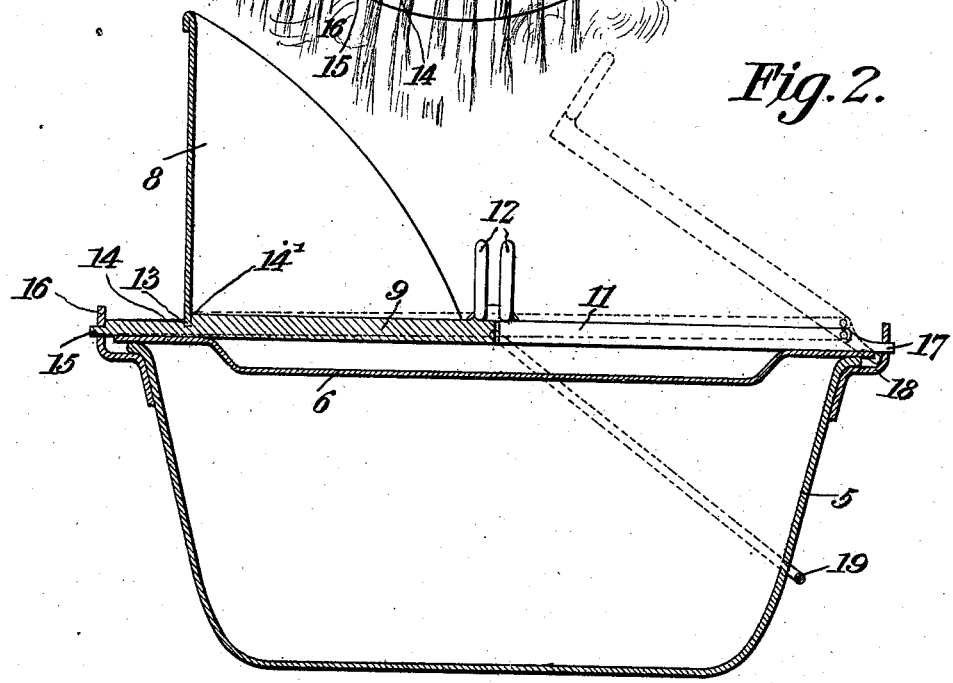

In the accompanying drawings forming a part of this specification: Figure 1 is a perspective view of a domestic boiler constructed in accordance with my invention, showing the kettle tilted to permit the discharge of the surplus liquid. Fig. 2 is a longitudinal sectional view of the same.

Similar numerals of reference indicate corresponding parts in all of the figures of the drawings.

The improved device is principally designed for use in connection with pots, kettles and other domestic boilers and by way of illustration is shown applied to a kettle of the ordinary construction in which 5 designates the cooking vessel and 6 the cover. The cover 6 is formed with a plurality of spaced perforations 7 which communicate with the interior of the kettle so as to permit the ready discharge of the surplus liquid when the kettle is tilted. Spaced inwardly from one edge of the cover and arranged in advance of the perforations 7 is a vertically disposed plate or guard 8 which forms a shield and serves to protect the hands of the operator from the steam and boiling water during the pouring operation.

Extending transversely across the top of the cover 6 is a lifting member 9 provided with an elongated slot 10 in which is pivotally mounted a lever 11, the stationary member 9 and movable member 11 being provided with vertically disposed handles 12 to assist in supporting the kettle in tilted position. Formed in the base of the guard or shield 8 is a recess 13, and secured to the perforated end of the cover and engaging the walls of the guard at said recess are inclined flanges 14 defining a dove-tailed socket for the reception of the adjacent end of the stationary section of the lifting-member as shown. The stationary section 9 of the lifting-member is provided with a transverse shoulder 14' adapted to bear against the vertical wall of the guard or shield 8 and is provided with a terminal lip 15 which engages a recess formed in an ear or lug 16 extending laterally from one side of the kettle 15. The pivoted end of the movable member 11 is formed with a reduced extension 17 which engages an opening or recess in an ear or lug 18 similar in construction to the ear 16 and extending laterally from the opposite side of the kettle as shown.

When using the kettle for cooking purposes the cover is placed in position on the same with the opening 13 registering with the opening in the adjacent ear 16 after which the relatively stationary section 9 of the lifting member is introduced in the dove-tailed socket and moved longitudinally until the shoulder 14' engages the vertical wall of the guard or shield and the lip 15 enters the socket in the adjacent ear of the kettle. The movable member 11 is then forced downwardly within the recess 10 which causes the lip 17 to engage the opening in the adjacent ear 18 on the kettle. It will thus be seen that by gripping the handles 12 and bail 19 the kettle may be tilted so as to permit the surplus liquid to drain through the openings or perforations in the cover as best shown in Fig. 1 of the drawing.

In order to remove the cover it is merely necessary to elevate the pivoted member 11 to the position indicated by dotted lines in Fig. 2 when the stationary member 9 of the lifting device may be readily withdrawn so as to permit the cover to be quickly detached.

From the foregoing description it will be seen that there is provided an extremely simple, inexpensive and efficient device admirably adapted for the attainment of the ends in view.

Having thus described the invention what is claimed is:

1. A cooking vessel provided with oppositely disposed perforated ears, a cover and a sectional lifting device adapted to engage the perforation in the ears for locking the cover in position on the vessel, said lifting device being provided with intermediate operating handles one of which is movable vertically to inoperative position thereby to release the adjacent section from engagement with the contiguous perforated ear.

2. A cooking vessel provided with oppositely disposed perforated ears, a perforated cover having a vertically disposed guard extending inwardly from one edge thereof and provided with a recess, and a lifting device extending transversely across the cover and passing through the opening in the guard for engagement with the ears, said lifting device being provided with intermediate operating handles one of which is stationary and the other movable vertically to inoperative position thereby to release the lifting device from engagement with the perforated ears.

3. A cooking vessel provided with oppositely disposed perforated ears, a perforated cover having a vertically disposed guard spaced inwardly from one edge thereof and provided with a recess, guiding flanges extending from the walls of said recess to the adjacent edge of the cover, and a lifting lever passing through the recess in the guard and bearing against the flanges for engagement with the perforations in the ears, said lifting device being provided with intermediate operating handles one of which is stationary and the other movable vertically to inoperative position thereby to release the lifting device from engagement with the perforated ears.

4. A cooking vessel provided with oppositely disposed perforated ears, a perforated cover provided with a vertically disposed guard and having a recess formed therein, a lifting member passing through the recess in the guard and provided with reduced extensions adapted to enter the perforations in the ears, and a shoulder formed on one end of the member and adapted to bear against the adjacent wall of the guard at said recess, said lifting device being provided with intermediate operating handles one of which is stationary and the other movable vertically to inoperative position thereby to release one of said extensions from engagement with the adjacent perforated ear.

5. A cooking vessel provided with oppositely disposed perforated ears, a cover having a vertically disposed guard provided with a recess, and a lifting member consisting of relatively stationary and movable levers adapted to engage the perforations in the ears, said lifting member being provided with co-acting handles one of which is movable vertically to inoperative position thereby to release said member from engagement with the adjacent perforated ears.

6. A cooking vessel provided with oppositely disposed perforated ears, a perforated cover having a vertically disposed guard spaced inwardly from one edge of the cover at said perforations, a relatively stationary lever extending transversely of the cover and engaging the perforations in one of said ears, a movable lever pivoted on the stationary lever and adapted to engage the adjacent ear, and co-operating handles secured to the adjacent ends of said levers, one of said handles being movable vertically to inoperative position thereby to release the lever from engagement with the adjacent perforated ear.

In testimony that I claim the foregoing as my own, I have hereto affixed my signature in the presence of two witnesses.

WILLIAM X CAREY.
his mark

Witnesses:
J. M. SPARKMAN,
F. L. JOHNSON.